United States Patent
Davis

[15] 3,679,061
[45] July 25, 1972

[54] MOLDED FILTER LEAF

[72] Inventor: Steven S. Davis, Bountiful, Utah

[73] Assignee: Envirotech Corporation, Salt Lake City, Utah

[22] Filed: June 15, 1970

[21] Appl. No.: 46,330

[52] U.S. Cl............................................................210/486
[51] Int. Cl..........................................................B01d 33/22
[58] Field of Search..........................210/331, 346, 486, 487

[56] References Cited

UNITED STATES PATENTS 3,263,819  8/1966  Schmidt et al..........................210/486

FOREIGN PATENTS OR APPLICATIONS 646,031    7/1962   Canada..................................210/331
1,013,866  12/1965  Great Britain.........................210/487

Primary Examiner—Reuben Friedman
Assistant Examiner—Frederick F. Calvetti
Attorney—Robert R. Finch and Richard F. Bojanowski

[57] ABSTRACT

A double-faced filter leaf formed from two flat, molded sections joined back-to-back. Drainage channels are formed between parallel ribs molded on the front face of each section. A collecting channel transversely intersecting the drainage channels is also formed on the front face adjacent one edge of the leaf. Conduits for applying vacuum and removing filtrate are provided between the sections by opposed grooves formed on the back faces thereof. The conduits extend the full length of the leaf and are in communication with the drainage channels on the front face through one or more ports. Means are provided to hold a filter medium in place over the ribs.

9 Claims, 6 Drawing Figures

PATENTED JUL 25 1972 3,679,061

INVENTOR.
Steven S. Davis
BY Robert R. Finch
His Attorney

MOLDED FILTER LEAF

BACKGROUND OF THE INVENTION

A hanging double-faced filter leaf is conventionally a thin hollow shell having opposite faces of perforated metal or screen and overlain by a filter medium. Vacuum is applied to the interior of the shell and filtrate removed therefrom by dip tubes extending into the bottom portion of the shell. Filter cake formed on the filter medium is discharged by reducing the applied vacuum, by blow back and/or by scraping.

A disadvantage of the hollow leaf structure is that solids sifting through the filter medium often block the screen. When this occurs, portions of the leaf become ineffective and eventually the filter medium must be removed and the screen subjected to a costly, time-consuming cleaning operation.

An additional disadvantage of hollow leafs is their relatively high construction costs since they must be assembled from several parts such as a frame, screen, dip tube and supports.

By forming the filter leaf from two molded sections rather than casting the leaf as a single piece, drilling of vacuum conduits and/or other intricate machining operations are eliminated.

OBJECTS OF THE INVENTION

A primary object of the invention is to provide a filtration device comprising a solid filter leaf formed from two solid molded pieces having only surface drainage channels underlying the filter medium, thus eliminating the use of a screen and the attendant problems of blockage and cleanup associated therewith.

Another important object is to provide a leaf structure which is readily adaptable to construction by molding, thus minimizing initial construction costs.

A related object is the provision of a symmetrical leaf design which permits the leaf to be formed from two identical pieces of sections, thereby requiring the use of only a single mold for manufacture.

SUMMARY OF THE INVENTION

The foregoing and possibly other objects of the invention are attained by a leaf construction having a pair of filtering faces formed from two solid molded sections joined back-to-back. Each section comprises an impervious web support having a plurality of substantially parallel elongated channels intersecting with at least one collecting channel which in turn communicates at the lower end of the leaf through ports with one or more conduits formed between the sections for applying vacuum and withdrawing filtrate.

With the particular leaf construction of the invention, solids which sift through a filter medium covering the web support will deposit only in the surface channels and cause only a slight reduction in filtering capabilities. Moreover, the high liquid velocities which pass through the ports and the vacuum conduit, discourage solids from depositing therein thus permitting the surface channels to be self-cleaned. However, should a solids buildup occur, it can usually be overcome by blow back. If this fails and if removal of the medium is required to remove the deposited solids, shut-down time is cut to a minimum as only exterior surfaces and a few ports require cleaning.

DESCRIPTION OF THE PREFERRED EMBODIMENT

Figure 1:
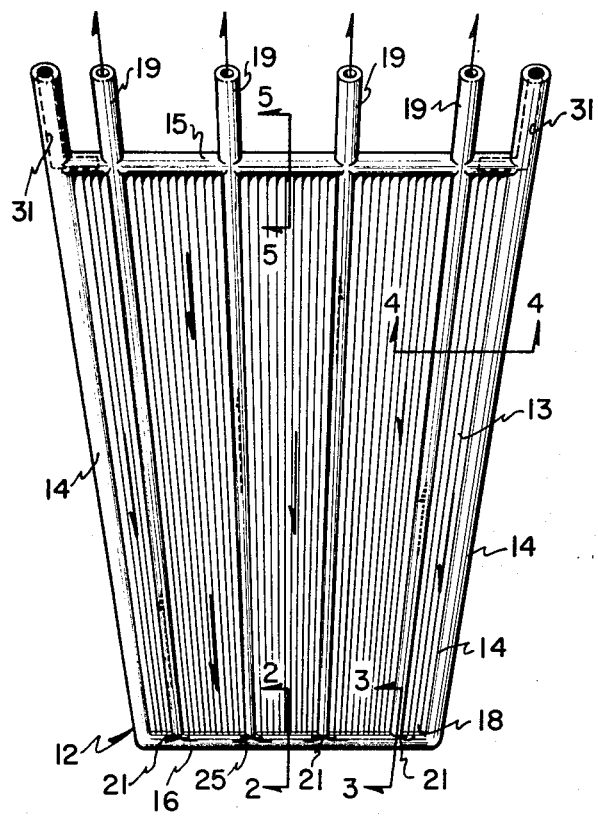
FIG. 1 is a perspective view showing a filter leaf without a filter medium embodying this invention.
Figure 2:
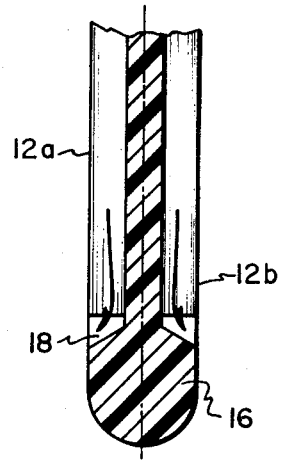
FIG. 2 is a cross-sectional view taken in the plane of line 2—2 of FIG. 1 looking in the direction of the arrows.
Figure 3:
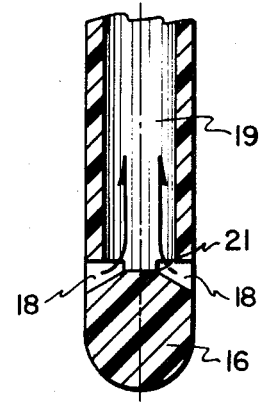
FIG. 3 is a cross-sectional view taken in the place of line 3—3 of FIG. 1 looking in the direction of the arrows.
Figure 4:
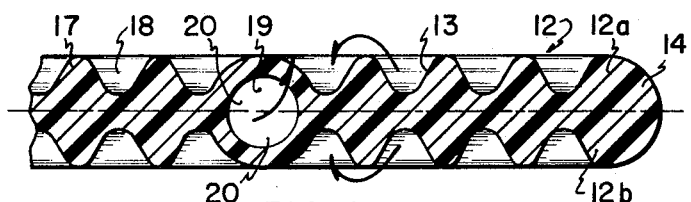
FIG. 4 is a cross-sectional view taken in the plane of line 4—4 of FIG. 1 looking in the direction of the arrows.

As shown in FIGS. 1 through 5 in which like elements are designated by the same reference numerals, the filter leaf 12 comprises two sections 12a and 12b mounted back-to-back with their exposed front faces being ribbed to provide drainage decks as hereinafter described. Each section 12a and 12b is molded as a solid section from any suitable thermosetting or thermoplastic material to form an impervious front face 13 having a plurality of upstanding spaced ribs 17 parallel to each other, two side edges 14 running parallel to the ribs, a top edge 15 and a bottom edge 16. Substantially parallel drainage channels 18 are formed as a result of the spaces between the ribs. As shown, the two vertical side edges 14 extend above the top edge 15 and are adapted for use as hangers to support the filter leaf. To provide additional strength, a reinforcing member 31 may be molded into the vertical and top edges.

As used herein, the term "impervious" means that the filter face is not porous and does not contain any openings through which liquid may flow, with the exception of ports which are in communication with the tubular channels later described.

The ribs 17 and channels 18 terminate short of the bottom edge 16 to intersect with and define a transverse collecting channel 18 bordered by the bottom edge for receiving filtrate from the drainage channels. A plurality of internal vacuum pipes 19 is formed between sections 12a and 12b by concave grooves 20 molded in the back surfaces thereof. As illustrated, the grooves are complementary or opposite each other so that together they form a single conduit. However, it is not mandatory that there be complemental or opposed grooves as it may be desirable to have a semi-tubular conduit defined by one such groove and the flat back face of the other section.

Communication between the internal conduits and the filter surface is provided by ports 21 which extend from the collecting channel 18 through the section into the conduits 19. In normal operation the upper ends of the conduits 19 will be in connection with any suitable vacuum source (not shown).

For assembly, the two sections (12a and 12b) are placed back-to-back then either clamped or cemented together. The assembled leaf is then covered with a suitable filter medium and retained thereon in known manner. For clarity purposes, the filter medium is not shown in the drawings.

The filter leaf is designed and shaped to enable each section of the leaf to be molded as by injection molding in either a single or a number of pieces, depending on leaf size. In this connection, the channels and grooves are smoothly concave and contain no undercuts, thus facilitating removal from a mold. In addition, this type of shape and design results in unhampered drainage flow.

In operation, filtrate passes through the filter medium into the surface channels thence downwardly, as shown by the arrows to the collecting channel whence it flows through the ports 21 into the vacuum tubes 19. Cake forms on a filter medium covering both outer faces and is discharged either by scraping, by pressure changes, or both.

If desired, horizontal strips may be fastened over the top of the vertical ribs in the FIG. 1–5 structure as an aid in supporting the filter medium heavy with cake.

Figure 6:
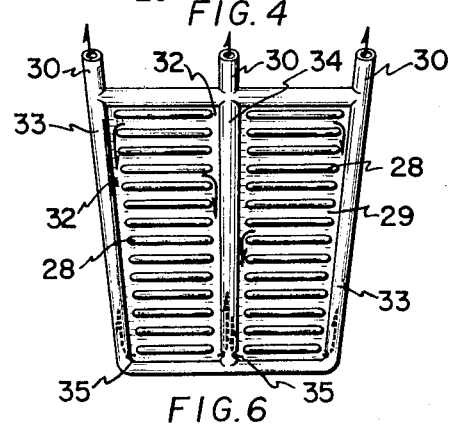
FIG. 6 is a perspective view illustrating a modified embodiment of this invention.
Figure 5:
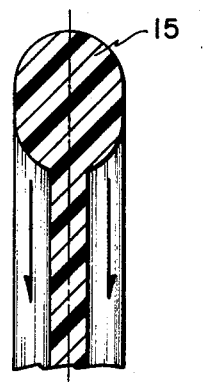
FIG. 5 is a cross-sectional view taken in the plane of line 5—5 of FIG. 1 looking in the direction of the arrows.

FIG. 6 shows a particular embodiment of the invention wherein the surface channels 29 are formed by horizontal ribs 28 rather than by vertical ribs. In this case the intersecting collection channels 32 are vertical and border side edges 33 and/or a raised center section 34. Ultimately, they are in communication with an internal vacuum tube 30 through ports 35. Arrows show the direction of liquid flow. The horizontal ribs aid in holding the cake and filter medium in place; hence, this design is especially useful with dense or slippery cakes.

Although the invention has been described with reference to specific embodiments, it is not intended that the invention be limited thereto but to include all the variations and modifications falling within the scope of the appended claims.

What is claimed is:

1. A double-faced filter leaf construction having top, bottom and side edges comprising two solid impervious substantially flat molded sections joined together in back-to-back relationship, a plurality of parallel ribs on each face of said leaf forming drainage channels therebetween, a collection channel formed on each face to transversely intersect said drainage channels, at least one elongated internal vacuum tube formed by a groove in the back surface of at least one of said sections and extending longitudinally thereof between and parallel to said faces, said internal vacuum tube being in communication with said collection channel and extending upward to the top edge of said leaf, and port means in said leaf located substantially near the junction of said collection channel and said vacuum tube, said port means constituting the sole communication between the collection channel and the vacuum tube.

2. A construction according to preceding claim 1 in which said drainage channels are formed between parallel ribs running longitudinally of said leaf and said collection channel is transverse to said drainage channel and is formed between the ends of said ribs and the bottom edge on said leaf.

3. A construction according to preceding claim 2 in which said surface channels are concave and said elongated internal vacuum tube is formed by a pair of opposed grooves in the back side of each section.

4. A construction according to preceding claim 3 in which said sections are molded and said side edges are extended upward to form a means for hanging said leaf.

5. A construction according to preceding claim 4 in which said impervious sections are symmetrical in shape and design.

6. A construction according to preceding claim 5 in which a reinforcing member is molded into said side and top edges.

7. A construction according to preceding claim 6 in which spaced horizontal strips override said parallel ribs running longitudinally of said leaf.

8. A construction according to claim 6 in which a filter medium overrides the faces of said leaf.

9. A construction according to claim 1 in which said drainage channels are formed between parallel horizontal ribs and intersect with at least one vertical drainage channel.

* * * * *